3,369,950
HEAT SEALING PLASTIC BAGS
Horst Rosewicz, Friedrich Fecher, and Jakob Schoenmann, Ludwigshafen (Rhine), and Gernot Manhart, Limburgerhof, Pfalz, Germany, assignors to Badische Anilin- & Soda-Fabrik Aktiengesellschaft, Ludwigshafen (Rhine), Germany
Filed Mar. 26, 1965, Ser. No. 443,015
Claims priority, application Germany, Mar 28, 1964, B 76,109
1 Claim. (Cl. 156—464)

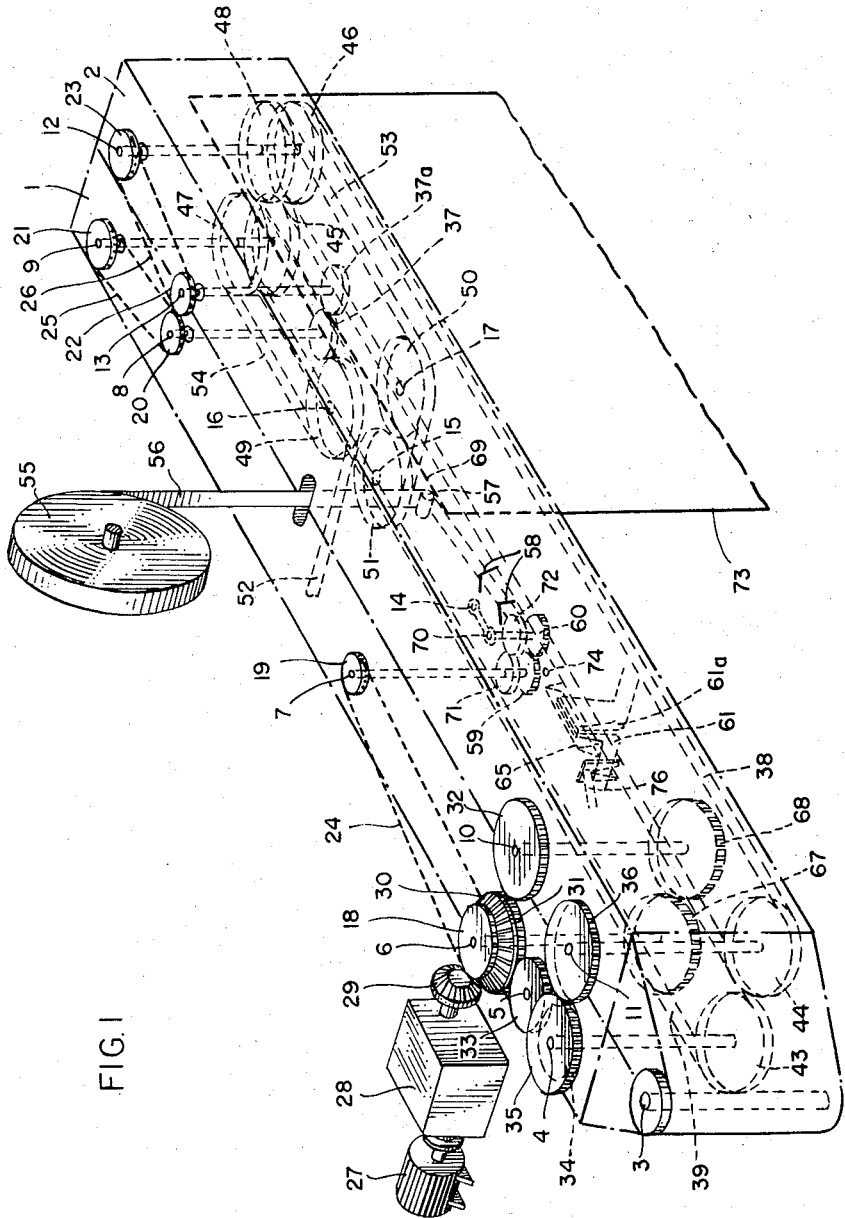

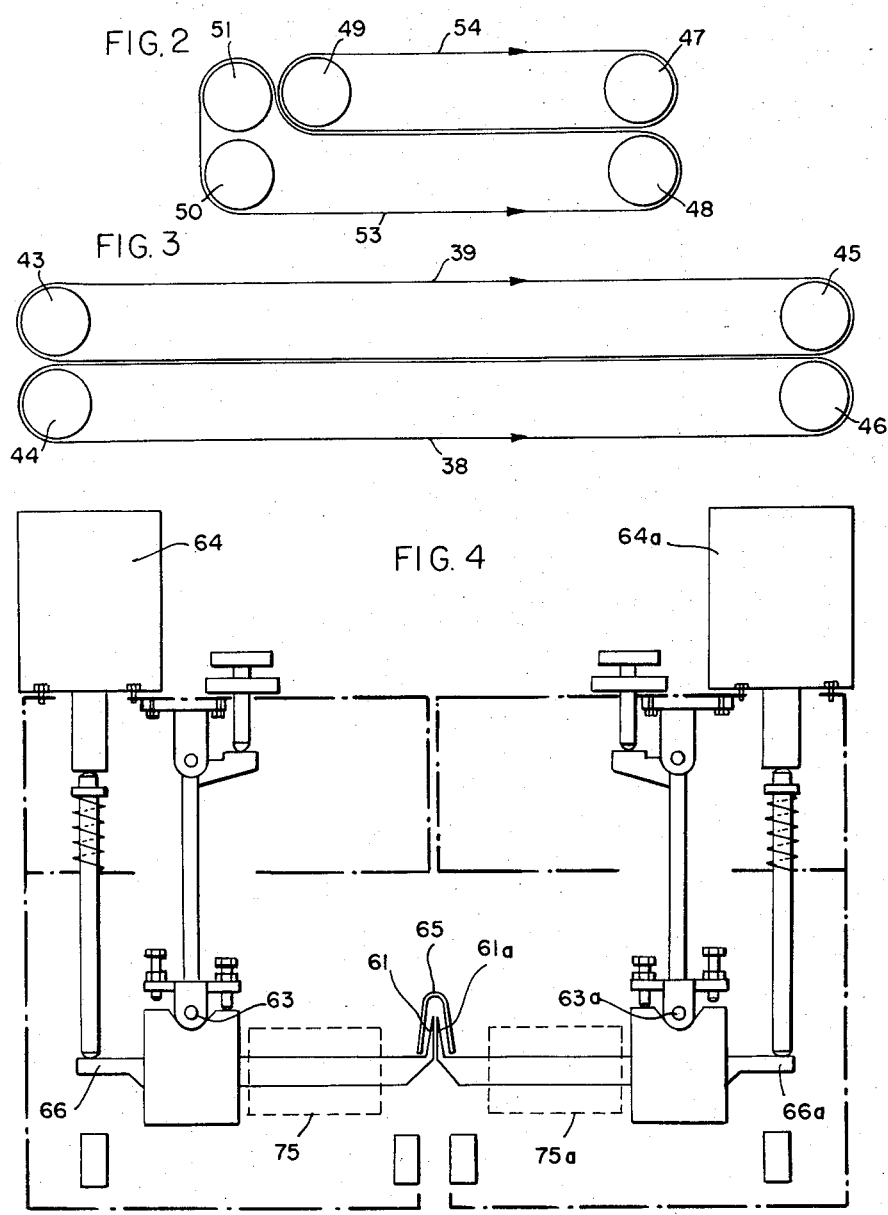

This invention relates to uniting plies of thermoplastic sheeting. In particular it relates to heat-sealing bags of plastic sheeting.

Bags of plastic sheeting having a thickness of about 0.2 mm. may be heat-sealed continuously by apparatus in which the heat required for sealing is transmitted to the sheeting by means of convection, conduction or radiation.

Apparatus is known in which heat is supplied to the sheeting by means of heated compressed air. The plies to be heat-sealed are conveyed and guided laterally by four endless steel bands arranged in pairs. The seam of the sheeting which is to be heat-sealed is located between the two pairs of bands which are spaced one above the other. The compressed air is supplied by means of two jets oppositely disposed.

It is an advantage of this apparatus that contact of the seam with a stationary metallic pressing member is avoided during the heat-sealing process. The heat-sealing process may therefore be rapidly discontinued by shutting off the supply of compressed air by means of a needle valve. It is a disadvantage of this heat-sealing machine however that in the case of very dusty inner surfaces, the strength of the heat-seal is dependent on the thickness of the layer of dust and the seam reopens under tension on the sheeting where there is a heavy deposit of dust. This is also true when the layer of dust has been interrupted by means of toothed pressure rolls.

For this reason another prior art apparatus makes use of the outer face of the sheeting, which always has only a small amount of dust, as the seam surface and uses as the closure a strip of the same material as the bag to be heat-sealed. This strip is shaped by a folding machine into a shape like a roof ridge and laid over the bag opening which has been previously cut smoothly and accurately. In this condition, the upper edge of the bag and the strip are gripped by a circulating steel band and conveyed in succession to the heat sealing and cooling stations. A spring-mounted electrically heated metal member serves as the heat sealing station and this transmits heat to the outer face of the bag through the steel band and the ridge-shaped folded strip.

The cooling station in this prior art apparatus consists of spring-mounted, water-cooled hollow metal strips. The heated band together with the welded plastic cools at this point, and this may readily lead to detachment of the plastic.

This apparatus has the disadvantage that conveyance of the introduced bag of sheeting cannot be interrupted because otherwise the plastic will burn. Moreover the constant change in temperature produces internal stresses in the metal band which greatly shorten the life of these steel bands.

It is common to both of the said methods of heat-sealing plastic sheeting that the heat must be brought inwardly from outside to achieve a heat seal. Since the process of filling, in the case of bulk goods, usually proceeds at high speed, the residence time necessitated by the low thermal conductivity of the plastic and the thick walls of the sheeting to be heat-sealed required to provide strength must be achieved by an adequate length of the heating station. This results in very long machines. Moreover the amount of heat required to soften the sheeting must be removed again, so that cooling means is necessary.

The object of this invention is to provide a method for liquid-tight and gas-tight heat-sealing of plastic bags. Another object of the invention is to provide a heat-sealing method for tightly heat-sealing dusty plastic bags.

This invention obviates the difficulties which were unavoidable hitherto in heat-sealing dusty plastic bags and provides a continuous heat-sealing method. In the method according to this invention the upper edge of the bag is accurately cut, the outer surface of the bag is heated and superficially melted on both outer faces of this edge, the closure strip folded longitudinally in the middle in the shape of a ridge is placed over the upper edge of the bag, heated and superficially melted on both inner faces and passed, with its central fold upward, over the melted outer faces of the bag, pressed externally on both sides and thus united with the bag.

The annular strip cut off from the upper edge of the bag is discharged with pressure at the same time as the bag moves.

The closure strip is withdrawn from a stock roll, folded in the middle, heated and superficially melted on the inner faces and intermittently pressed on the outer faces of the upper edge of the bag.

Apparatus for heat-sealing plastic bags with a closure strip comprises a stationary rear frame member and a movable front frame member, a hinge between the two members to connect the movable frame member to the stationary frame member, interengaging tongue and groove on the frame members to prevent relative movement thereof, four vertical shafts in the stationary frame member and three vertical shafts in the movable frame member, four of the seven shafts being mounted at the outer ends and three in the middle of the frame members, horizontally rotating metal discs carried on the outer shafts, said metal discs guiding two long endless steel bands, further horizontally rotating metal discs carried by the inner shafts and by further shafts, the last-mentioned metal discs guiding a pair of short conveyer bands, means for driving the steel bands in horizontal planes with a space between the long steel bands and the short steel bands, the long steel bands gripping and pressing together the bag on both sides below the upper edge of the bag, the short steel bands gripping and pressing together the bag above the upper edge of the bag, cutting means above the pair of long conveyer bands, a profiled metal sheet in the form of an inverted V above the abutting upper edges of the pair of long conveyer bands, two oppositely arranged wheels mounted in frames and having variable front faces in the middle of the profiled sheet, one of the wheels being rigidly mounted in the frame and the other being movable relatively thereto, driving means for the said wheels, a contact at the rear end of the profiled metal sheet for switching on guide means for the closure strip, and two opposed electrically heated heating wedges for heating the edge of the bag, said heating wedges being rotatably mounted about horizontal axles and adapted to be swung downwardly by counterweights and moved upwardly by electromagnets.

The method according to this invention uses an apparatus in which a strip folded in the form of an inverted V is used for the closure but the heat does not have to penetrate inwardly from outside for it is supplied to the two surfaces to be connected by means of two metallic heating wedges.

During heat-sealing, therefore, only a thin layer softens at the surface of the parts to be heat-sealed. Since it is not necessary for the heat to be conveyed inwardly from outside, a low thermal conductivity of the plies of the closure no longer has any decisive influence. Long residence times are thus not required and consequently a short apparatus may be designed even with high conveying speeds.

Furthermore the amount of heat required to soften the thin layers at the joint surfaces is only a small part of that which would be required if the sheeting had to be uniformly melted through its whole thickness. Intense cooling of the seam is the superfluous so that the machine does not require any cooling water. Only a blower is required after sealing to remove the relatively small amount of heat supplied.

Steel bands which are subjected to temperature changes and which may therefore break are dispensed with so that the apparatus operates very reliably.

In the method according to this invention the outer surfaces, which are always less dusty, are used for the seam. Tight and strong heat-sealed seams are therefore obtained even when there is a high incidence of dust.

Another advantage of the invention is that the seam, when under pressure from the bulk goods contained therein and from packages heaped on top thereof, is subjected to uniform shearing stresses in the plane of the joint.

The apparatus combines a short constructional design with high operating speeds, great reliability in operation and gives seams of high strength. Moreover the apparatus is simple to operate and seams prepared therewith have favorable stress characteristics.

The invention will be further described with reference to the accompanying drawings in which:

FIGURE 1 is a perspective diagrammatic view of the apparatus,

FIGURES 2 and 3 are diagrammatic representations of the arrangement of the pairs of bands, and FIGURE 4 shows in greater detail the arrangement of the heating wedges.

The apparatus according to the invention is mounted in a two-part frame consisting of a stationary rear frame member 1 and a rotatable front frame member 2 (FIG. 1). The front member 2 is rotatable about a hinge 3. Ten vertical long shafts 4 to 13 are mounted in the two frame members, as are also four short shafts 14 to 17. Shafts 15 to 17 carry conveying members serving to convey the sections parted by the cutting means. Shafts 6 to 9, 12 and 13 carry pulleys 18 to 23 to receive V-belts or chains 24 to 26.

The chains or V-belts are driven by a motor 27, a variable speed gear 28 and a small bevel wheel 29 which engages with a large bevel wheel 30. The bevel wheel 30 drives a pinion 31 mounted on the same shaft 6 and also, through V-belt 24, the pulley 19 mounted on shaft 7. Pinion 31 drives directly a pinion 32 mounted on shaft 10 and, through a small pinion 33 on the shaft 5, a pinion 34 on the shaft 4. Above the pinion 34 on the same shaft 4 there is a pinion 35 through which the shaft 11 is turned through pinion 36.

Shafts 8 and 13, situated at the end of the machine where the bag enters, carry on the lower ends a cutting means consisting of two rotating blades 37 and 37a.

For reception of a pair of conveyor bands 38, 39, guide rolls 43 and 44 for the two bands 38 and 39 are provided at the lower ends of shafts 4 and 11. Corresponding to the two guide rolls 43 and 44 are two further guide rolls 45 and 46 mounted on shafts 9 and 12 (FIG. 3).

At the same level as the guide rolls 45 and 46 but displaced laterally therefrom there are five further guide rolls 47 and 51 for the reception of the two conveyor bands 53, 54, one opposite the other. The front band 53 is also guided around a third guide roll 49 so that the strip 52 of sheeting cut by the blades 37 and 37a may be discharged laterally (FIG. 2).

Between the upper pair of conveyer bands 53, 54 and the lower pair of conveyer bands 38, 39 and behind the shafts of the conveyer pulleys in the direction of conveyance, two shafts 8 and 13 are provided on which the rotating blades 37 and 37a are mounted. These cut the bag, introduced at a variable height, at a predetermined distance above the lower conveyer bands 38, 39.

The upper edge 69 of the bag which is thus cut straight is conveyed beneath a flat strip 56 wound off from a roll 55, which is guided by a roll 57 and brought into the shape of an inverted V by suitably shaped wires 58. In the middle of the folding means 74 there are two horizontally mounted opposed wheels 59, 60 having a profiled surface. Wheel 59 is mounted on a vertical rigid shaft 7 and wheel 60 is mounted on a vertical shaft 70 which is movable eccentrically about shaft 14. The two wheels 59 and 60 are connected through pinions 71, 72, the shaft 7 and the chain 24 with the driving means 18, 30, 29 and constantly driven.

When the front vertical edge 73 of the bag reaches that point of the folding means 74 at which the two opposed wheels 59, 60 are situated, a movement of the eccentrically mounted shaft 70 is initiated by a contact (not shown) so that the two wheels 59, 60 are pressed against each other. In this way the strip 56, which in the meantime has been folded, together with the upper edge of the bag which has been cut at a predetermined height above the upper edge of the lower conveyer band, are gripped and conveyed to the heat sealing station. This consists of two heated wedges 61 and 61a made of a metal having high thermal conductivity, for example copper, which are mounted opposite to each other. The wedges are rotatable about horizontal axles 63, 63a outside the frame members in the direction of the band (FIG. 4).

Rest position of the wedges 61 and 61a is that in which they are swung downwardly by the weight of the heating windings 75 and 75a surrounding them so that they do not contact the ridge shaped profiled metal sheet 65 which here serves as the counter support.

When the strip and the top edge of the bag are beneath this metal sheet, which has the shape of an inverted V, magnets 64 and 64a exert a force on the short portions 66 and 66a of the heating wedges which are removed from the heated ends and which function as lever arms, so that the two heating wedges 61 and 61a swing into the metal sheet 65 in such a way that they contact and soften the two outer faces of the top edge of the bag and the two inner faces of the strip at the same time. The V-shaped strip is thereafter gripped and pressed together by two spring mounted opposed profiled wheels 67, 68 mounted on vertical shafts 6 and 10. The softened surfaces of the bag and strip are thus heat-sealed under pressure. Finally the closed bag is conveyed further and discharged from the apparatus.

A scissors member 76, which cuts the closure strip immediately behind the closed bag, is coupled with the contact for the conveyor mechanism 59 and 60 for the closure strip 56.

If necessary, the seam may be cooled with a stream of air produced by a small blower.

What we claim is:

1. Apparatus for heat-sealing plastic bags with a closure strip comprising a stationary rear frame member, and a movable front frame member, a hinge between said two frame members to connect said movable frame member to said stationary frame member, interengaging means on said frame members to prevent relative movement thereof, four vertical shafts in said stationary frame member and three vertical shafts in said movable frame member, four of said seven shafts being mounted at the outer ends and three in the middle of said frame members, horizontally rotating metal discs carried on the outer shafts, said metal discs guiding two endless long steel bands, further horizontally rotating metal discs carried by the inner shafts and by further shafts, the last mentioned metal discs guiding a pair of short steel conveyer bands, means for driving said steel bands in horizontal planes with a vertical space between said long steel bands and said short steel bands, said long steel bands gripping and pressing together the bag on both sides below the upper edge of said bag, said short steel bands gripping and pressing together said bag above said upper edge of the bag, cutting means above said pair of long conveyer bands, a profiled metal sheet in the form of an inverted V above the abutting upper edges of said pair of long conveyer bands, two oppositely arranged wheels mounted in said frames, one of said wheels being rigidly mounted in said frame and the other being movable relatively thereto, driving means for said wheels, and two electrically heated heating wedges arranged horizontally opposite to each other for heating said upper edge of said bag, said heating wedges being rotatably mounted on horizontal axles and adapted to be swung downwardly by counter-weights and moved upwardly by electromagnets.

References Cited

UNITED STATES PATENTS

| | | | |
|---|---|---|---|
| 2,293,687 | 8/1942 | Allen | 156—464 |
| 2,727,648 | 12/1955 | Grevich | 156—464 |
| 3,218,961 | 11/1965 | Kraft et al. | 156—583 |

DOUGLAS J. DRUMMOND, *Primary Examiner.*